Patented Oct. 5, 1937

2,094,608

UNITED STATES PATENT OFFICE 2,094,608

HYDROTROPIC MATERIAL AND METHOD OF MAKING SAME

Wolf Kritchevsky, Chicago, Ill.

No Drawing. Application June 8, 1936, Serial No. 84,228

19 Claims. (Cl. 260—124)

My invention relates to a new class of hydrotropic substances and method of producing the same.

It is known that a number of useful compounds can be prepared by condensing higher fatty acids and other organic carboxylic acids with alkylolamines in which the ratio of acid to the alkylolamine is one or more. Such compounds have been made before, and in each case there is at least one mol. of acid for each mol. of alkylolamine. Compounds of the character mentioned have a number of useful properties.

The principal object of my present invention is to form new and improved chemical substances of the general character outlined below.

Another object is to form condensation products of polybasic carboxylic acids, particularly higher molecular weight polybasic acids, and alkylolamines, which will have effective properties in either acid or alkali media.

Another object is to produce a series of hydrophillic compounds or water dispersible compounds of the class sometimes referred to as hydrotropic compounds.

I have discovered that if one mol. of a polybasic carboxylic acid, particularly the higher molecular weight polybasic acids, is condensed with alkylolamine, in molar proportions such that there are substantially at least two mols of alkylolamine for each carboxylic group present in the acid, a condensation product is obtained which is readily dispersible in water and which possesses many useful properties in either neutral, alkali or acid media. The resulting substances are dispersible and will retain their effectiveness in the presence of calcium and/or magnesium salts.

In forming my improved substances, while the condensation may take place at temperatures slightly below 100° C., for appreciable results the temperature should preferably be above 100° C. Condensations have been successfully carried out as high as 250° C. It may be stated that the temperature range should be high enough to obtain appreciable speed of reaction but should not be high enough to cause decomposition of the resulting product. I have found that for practical purposes, the best temperatures are between about 135 and 210° C. for most of the substances coming within the class of my invention. In some cases, as, for instance, in Example 5, care must be taken that too high a temperature is not employed as charring may take place. The time required for reaction may be as long as twenty hours or more at the lowest temperatures and as short as fifteen minutes at the higher temperatures.

Condensations may be made in neutral solutions or with the aid of condensing agents of either alkaline or acid character. The nature of the condensing agent has an effect upon the speed of reaction and temperature required. Although I have used several different condensing agents for experimental purposes, I have found that excellent products are obtained without the use of any condensing agents.

Compounds or substances are obtained having a variety of properties depending, among other things, upon the character of the polybasic carboxylic acid or the like and alkylolamine employed. Substances having good technical properties may be prepared by the use of lower molecular weight polycarboxylic acids such as tartaric acid, citric acid, adipic acid, and other similar acids having up to six carbon atoms in the molecule. For my most effective results, however, I prefer to use the polycarboxylic acids, having at least six carbon atoms, and, more particularly, those containing a still greater number of carbon atoms. The condensation products prepared by the use of these latter mentioned acids, or higher molecular weight acids, are clearly differentiated in at least many of their properties and uses from the products prepared from the lower molecular weight polycarboxylic acids. It will be understood that wherever I use the term "higher molecular weight polycarboxylic acid", I intend to cover such acids having at least six carbon atoms. Aside from the aliphatic acids mentioned above, I may employ polybasic acids of the aromatic series, hydroaromatic series, cyclic, alicyclic and heterocyclic series. Examples of suitable acids, in addition to those previously mentioned, are sebacic acid, phthalic acid, japanic acid, malonic acid, succinic acid, suberic acid, polycarboxylic acid derivatives of benzene, naphthalene, mellitic acid, and the like.

Derivatives of any of the acids mentioned above may also be employed such as sulphonic acid, halogen, and nitro derivatives.

It is not necessary to secure adequate results to use the free acids. For example, I may also use the acid halides, but, in this latter case, lower temperatures must be used for the condensation. I may also use esters or amides of acids, and their alkylol derivatives as well as acid anhydrides. In general, any organic polycarboxylic acid derivative containing a —CO— group may be used. It is obvious to the skilled chemist that when employing such derivatives of the acids, the number of equivalents of acid must be taken into consideration so that not substantially less than two mols of alkylolamine is present for each carboxyl group of the polycarboxylic acid.

I employ the term "alkylol" in describing the invention in a general sense to include substances like monoethanolamine, diethanolamine, triethanolamine, dialkylalkylolamines, diethylethanolamine, or monoethylalkylolamine, butanolamine, pentanolamine, hexanolamine, cyclohexylethanolamine, isobutanolamine, N-phenyl ethanolamine, laurylolamine, triethanolammoniumhydroxide, also the alkylolamines of glycerine, sugar and other mono- and polyvalent alcohols, and aryl and cycloalkylalkylolamines.

After considerable investigation, I have found it impossible up to the present time to determine the exact nature of the condensation products which I obtain. For this reason, I do not limit my invention to compounds having a specific formula, but rather to a process for producing improved hydrotropic materials and to the products resulting from such process.

It is not necessary to have the same alkylolamine in the reaction but two or more varied amines can be used. For instance, one molecule of a dicarboxylic acid can be condensed with four molecules of alkylolamines; one, for example, being a mono-alkylolamine, one a di- and two a tri-alkylolamine. Similarly, a mixture of polycarboxylic acids can be employed in place of a single acid.

The condensation may advantageously be carried out in either one or a plurality of stages. In the first method, the polycarboxylic acid or similar material is mixed with the requisite proportion of alkylolamine and condensed at the proper temperature and for the proper length of time. In the second method, in case a dicarboxylic acid is used, two mols of alkylolamine may be first condensed with the acid or similar material and the resulting product then condensed with an additional two mols or more of alkylolamine and so on.

It will be appreciated that I do not necessarily limit my invention to products resulting from the condensation of a mixture of alkylolamines and polycarboxylic acids wherein at least two mols of alkylolamine per carboxyl group are employed. I also include within the scope of my invention reaction or condensation products which contain substantial proportions of condensation products of alkylolamines and polycarboxylic acids or the like in which there are at least two mols of alkylolamine for each carboxyl group present in the polycarboxylic acid. Thus, for example, I may condense a mixture of an alkylolamine and a dicarboxylic acid wherein, for each carboxyl group of the dicarboxylic acid, there is present say 1.5 or 1.8 mols of alkylolamine, in which case such products contain a substantial proportion of products corresponding to the condensation product of a mixture of an alkylolamine and a dicarboxylic acid wherein, for each carboxyl group present in the dicarboxylic acid there are at least two mols of alkylolamines.

When a crude mixture of alkylolamines is used, mixtures of condensation products of the various types are obtained. In any usual process, when the alkylolamines are synthesized, a mixture is formed which contains mono-, di-, and tri-alkylolamines. This mixture can be directly condensed with the polycarboxylic acids to form products as described in my invention, thus avoiding the necessity of expensive purifying processes.

For the benefit of those skilled in the art, I give hereinafter a number of representative examples which are by no means exhaustive, but are sufficient to teach those skilled in the art the manner in which my invention may be practiced.

*Example 1*

One mol. of sebacic acid is mixed with four mols of diethanolamine and heated two to four hours at a temperature of between 150 and 175° C. A product is obtained which is soluble in organic solvents and is dispersible in aqueous media.

*Example 2*

One mol. of phthalic acid is condensed with four mols of monoethanolamine and heated for about three hours at between 160 and 180° C. A product is obtained having good dispersibility-in-water properties and other valuable characteristics.

*Example 3*

One mol. of citric acid is condensed with six mols of triethanolamine at a temperature of 170 to 190° C. for a few hours. The resulting oily product is very soluble in water and has good technical properties.

*Example 4*

One mol. of japanic acid and five mols of butanolamine are condensed for about three hours at a temperature of 170 to 195° C. A substance is obtained which is dispersible in water and is an emulsifying agent.

*Example 5*

One mol. of japan wax and five mols of diethanolamine are condensed at a temperature of between 160 and 180° C. for three to four hours. A product is obtained having excellent emulsifying properties.

In the above examples, I have tried to give a general practical idea of how the invention is practiced. I do not wish to be limited either by the examples or by other details. The examples merely illustrate the general principle that if one mol. of a polycarboxylic acid or similar material, as previously described, is condensed with alkylolamine in such a molal ratio that for each carboxyl group of the acid there is present not substantially less than two mols of alkylolamine, products of unusual solubility, emulsifying and solvent properties are obtained that have many valuable technical applications.

It is clear that I may use various alkylolamines and various polycarboxylic acids, and in each case a technically valuable product of the character desired is obtained. When a mixture of alkylolamines is used, the number of possible final products produced is greatly increased and in such a case it is quite probable that a mixture of compounds is obtained. Possibly some of the properties of my new hydrophillic or hydrotropic compounds are due to the fact that a mixture is formed.

Valuable products can also be prepared by introducing oxygenated sulphur or phosphorus groups into the molecule of my compounds. This may be accomplished by sulphating or phosphating my compounds in accordance with known practice, employing sulphuric acid, oleum, chlorsulphonic acid, phosphoric acid, $P_2O_5$, etc.

For the reasons noted above, I term the products of this reaction hydrotropic compounds, as such compounds are not only soluble or readily dispersible in water, but a water solution thereof will dissolve or disperse water-insoluble substances like fatty acids, gums and resins, both natural and synthetic. Such solutions will also disperse inorganic and organic pigments, vat dyes, etc.

Many of these substances dissolve readily also in alcohol and various organic solvents. Indeed, in some cases, they exhibit a hydrotropic action when dissolved in such media.

The compounds which can be made in accordance with my invention have a number of uses, all of which need not be mentioned here. However, I shall indicate a number of illustrative uses for the convenience of those skilled in the art.

My products will emulsify water-insoluble pigments with or without gums to form a dispersion. The products can be used in and will improve the action of paints, printing inks, etc. These products form excellent scouring preparations for wool. They may be used as emulsifying agents in water-oil emulsions. Vat dyes can be reduced with hydrosulphite and the hydrotropic fats without the presence of alkali and therefore can be used on wool, furs, etc., whereas otherwise their use is limited.

In an earlier part of the specification, I refer to temperatures at which the reaction is carried on by stating that temperatures even below 100° C. could be employed but that a temperature high enough to cause decomposition of the final product should not be used. For practical purposes, as I have already stated, any temperature between 130 and 210° C. can be used and the resulting product will have the valuable properties discussed. While the difference in temperature employed is mainly one of speed of the reaction, some slight variations in the product may be noted if wide variations of temperature are used. The temperature employed may be modified by the use of different pressure conditions. For example, if the condensation is carried out in a vacuum, much lower temperatures in many cases can be employed, and/or the heating time decreased.

While, in the various examples set forth above, I have mentioned the time involved in carrying out the condensation reaction, it will be appreciated that such may be varied depending upon the size of the batch of material treated and upon other factors. These matters, however, are readily understood by those skilled in the art. In general, the larger the batch of material being reacted, the longer time will be required to complete the reaction.

Wherever the term "condensation product" is employed, it will be understood to cover a reaction product between the acid and alkylolamine wherein water or acid or the like is split out as a result of the union of the molecules of acid and alkylolamine. Similarly, the term "condensing" is employed to cover a process wherein water or acid or the like is split out as a result of the union of the molecules of acid and alkylolamine.

This application is a continuation-in-part of my prior application, Serial No. 738,688, filed August 6, 1934.

What I claim as new and desire to protect by Letters Patent of the United States is:

1. A process for producing a hydrotropic material which comprises mixing together an alkylolamine and a polycarboxylic acid, in a ratio such that at least two mols of alkylolamine are present for each carboxyl group of the polycarboxylic acid, and heating the mixture at a temperature above 100° C. and below the temperature of decomposition of the resulting hydrotropic material.

2. The process of claim 1 wherein the polycarboxylic acid contains at least six carbon atoms.

3. The condensation product of a polycarboxylic acid and not substantially less than two mols of alkylolamine for each carboxyl group of the polycarboxylic acid.

4. The condensation product of claim 3, wherein the polycarboxylic acid contains at least six carbon atoms.

5. The condensation product of claim 3 wherein the polycarboxylic acid is an aliphatic acid.

6. The condensation product of claim 3 wherein the polycarboxylic acid is an aliphatic acid containing at least six carbon atoms.

7. The condensation product of claim 3 wherein the polycarboxylic acid is an aromatic acid.

8. The condensation product of claim 3 wherein the polycarboxylic acid is sebacic acid.

9. The condensation product of claim 3 wherein the polycarboxylic acid is japanic acid.

10. The condensation product of claim 3 wherein the polycarboxylic acid is phthalic acid.

11. A process for producing hydrotropic materials which comprises mixing together alkylolamine with polycarboxylic acid, in a ratio such that at least two mols of alkylolamine are present for each carboxyl group of the polycarboxylic acid, and heating the mixture at a temperature of about 100° C. or higher but below the temperature of decomposition of the resulting hydrotropic material to effect a condensation between the alkylolamine and polycarboxylic acid.

12. The condensation product of alkylolamine and a member of the group consisting of polycarboxylic acids, their esters, amides, halides and anhydrides, there being not substantially less than two mols of alkylolamine for each carboxyl group of the polycarboxylic acid present in the condensation product.

13. The condensation product of claim 12 wherein the polycarboxylic acid contains at least six carbon atoms.

14. The condensation product of claim 12 wherein the polycarboxylic acid is an aliphatic acid.

15. The condensation product of triethanolamine and a member of the group consisting of polycarboxylic acids, their esters, amides, halides and anhydrides, there being not substantially less than two mols of triethanolamine for each carboxyl group of the polycarboxylic acid present in the condensation product.

16. The product of claim 15 wherein the polycarboxylic acid or the radical thereof present in the esters, amides, halides and anhydrides contains at least six carbon atoms.

17. The condensation product of an alkylolamine and a member of the group consisting of saturated polycarboxylic acids, their esters, amides, halides and anhydrides, there being not substantially less than two mols of alkylolamine for each carboxyl group of the polycarboxylic acid present in the condensation product.

18. The product of claim 17 wherein the alkylolamine consists predominantly of triethanolamine.

19. The product of claim 17 wherein the polycarboxylic acid or the radical thereof present in the esters, amides, halides and anhydrides contains at least six carbon atoms.

WOLF KRITCHEVSKY.